(12) United States Patent
Rind et al.

(10) Patent No.: US 11,080,425 B2
(45) Date of Patent: Aug. 3, 2021

(54) STAGED INFORMATION EXCHANGE FACILITATED BY CONTENT-ADDRESSABLE RECORDS INDEXED TO PSEUDONYMOUS IDENTIFIERS BY A TAMPER-EVIDENT DATA STRUCTURE

(71) Applicant: ImagineBC, Gaithersburg, MD (US)

(72) Inventors: Erik H. Rind, Gaithersburg, MD (US); Nenad Dordevic, Gaithersburg, MD (US); Charles Tenly, Gaithersburg, MD (US); Michael Rosen, Gaithersburg, MD (US); Greg Rind, Gaithersburg, MD (US)

(73) Assignee: ImagineBC, Gaithersburg, MD (US)

( * ) Notice: Subject to any disclaimer, the term of this patent is extended or adjusted under 35 U.S.C. 154(b) by 186 days.

(21) Appl. No.: 16/520,534

(22) Filed: Jul. 24, 2019

(65) Prior Publication Data

US 2021/0026985 A1   Jan. 28, 2021

(51) Int. Cl.
*H04L 29/00* (2006.01)
*G06F 21/62* (2013.01)
*G06F 21/60* (2013.01)
*G06F 21/31* (2013.01)

(52) U.S. Cl.
CPC ........ *G06F 21/6254* (2013.01); *G06F 21/316* (2013.01); *G06F 21/602* (2013.01); *G06F 21/6263* (2013.01)

(58) Field of Classification Search
CPC .. G06F 21/6254; G06F 21/316; G06F 21/602; G06F 21/6263
See application file for complete search history.

(56) References Cited

U.S. PATENT DOCUMENTS

| | | | |
|---|---|---|---|
| 9,081,953 | B2 | 7/2015 | B'Far et al. |
| 2012/0265997 | A1 | 10/2012 | Laurie et al. |
| 2014/0282884 | A1 | 9/2014 | Bao et al. |
| 2017/0286717 | A1 | 10/2017 | Khi et al. |
| 2017/0287090 | A1 | 10/2017 | Hunn et al. |
| 2019/0096532 | A1 | 3/2019 | Dodge |
| 2019/0164153 | A1 | 5/2019 | Agrawal et al. |
| 2019/0190987 | A1 | 6/2019 | Waffner |
| 2019/0215159 | A1 | 7/2019 | Notani |
| 2019/0220906 | A1 | 7/2019 | Manning et al. |

FOREIGN PATENT DOCUMENTS

KR   10-2011-0054632 A   5/2011

OTHER PUBLICATIONS

Web Archive of Wibson.org, https://web.archive.org/web/20190712170045/https://wibson.org/, asserted to be captured on Jul. 12, 2019, pp. 1 to 6.
Web Archive of Datum.org, http://web.archive.org/web/20190711070502/https://datum.org/, asserted to be captured on Jul. 11, 2019, pp. 1 to 12.
Web Archive of Cointelegraph.com, https://web.archive.org/web/20190714035730/https://cointelegraph.com/news/blockchain-start-up-to-help-public-own-and-monetize-their-data, asserted to be captured on Jul. 14, 2019, pp. 1 to 3.

*Primary Examiner* — Ghazal B Shehni
(74) *Attorney, Agent, or Firm* — Pillsbury Winthrop Shaw Pittman, LLP; Joshua L. Tucker

(57) ABSTRACT

Provided is a closed-loop, referral-based, information-exchange in which end-users control, and in some cases can be rewarded for divulging, their personal information.

20 Claims, 6 Drawing Sheets

STAGED INFORMATION EXCHANGE FACILITATED BY CONTENT-ADDRESSABLE RECORDS INDEXED TO PSEUDONYMOUS IDENTIFIERS BY A TAMPER-EVIDENT DATA STRUCTURE

CROSS-REFERENCE TO RELATED APPLICATIONS

No cross-reference is presented at this time.

BACKGROUND

1. Field

The present disclosure relates generally to distributed computing applications and, more specifically, to staged information exchange facilitated by content addressable records indexed to pseudonymous identifiers of users by a tamper-evident data structure.

2. Description of the Related Art

Privacy is increasingly an important consideration when designing distributed computing applications. Consumers and regulators are becoming increasingly aware of the depth and sensitivity of the personal information that users are revealing to major technology platforms. These concerns are amplified as the public becomes aware of how much their privacy can be compromised by joining various data sets that, in isolation, may not be particularly revealing, but collectively serve to uniquely identify and characterize individuals with relatively high granularity. At the same time, major technology platforms are earning substantial profits by making such information available to third parties, like advertisers, without providing commensurate benefits to users or offering users effective control over their data. Existing distributed computing approaches are not well suited to serve users in a privacy-conscious world.

SUMMARY

The following is a non-exhaustive listing of some aspects of the present techniques. These and other aspects are described in the following disclosure.

Some aspects include a process that includes: receiving, with a server system, via a network, a first query from a first computer system of an entity seeking to acquire information about users, wherein the first query comprises criteria specifying a first class of attributes of users; in response to the first query, accessing a first data repository and selecting a first subset of users from a set of users having information in the first data repository, wherein: first subset of users are selected based on the first subset of users having attributes that satisfy the criteria; and the first data repository comprises a plurality of user records each comprising: a respective pseudonymous user identifier, and a respective plurality of non-personally identifiable attributes of a respective user; receiving, with the server system, via the network, from the first computer system, data specifying a second query, wherein: the second query requests a second class of attributes of users, and the second class of attributes are more personally identifying among the set of users than the first class of attributes; based on selecting the first subset of users and receiving the data specifying the second query, sending, with the server system, via the network, to native-client-applications executing on user computing devices of at least some of the first subset of users, a request to obtain responses to the second query; receiving, with the server system, from the native-client-applications of a second subset of users among the first subset of users, approval to obtain responses to the second query; in response to receiving approval, adjusting, with the server system, respective scores associated with the second subset of users and providing responses to the second query to the first computer system, wherein at part of at least some of the responses to the second query are provided, at least in part, by: accessing a tamper-evident data structure that associates pseudonymous user identifiers of respective users with respective addresses of respective ciphertexts and selecting addresses in response to the respective addresses being associated in the tamper-evident data structure with respective pseudonymous user identifiers of at least some users in the second subset of users; retrieving ciphertexts identified by the selected addresses from a decentralized second data repository, the decentralized second data repository being different from the tamper-evident data structure and the first date repository; decrypting, to form plaintext records, respective ciphertexts with respective native-client-application instances executing on user computing devices of users among the second subset of users, wherein: different native-client-application instances have access to different encryption keys of different ones of the respective ciphertexts, and the server system does not have access to the encryption keys; and determining the at least part of the at least some of the responses to the second query with the plaintext records; and storing, with the server system, the adjusted scores in memory, wherein: the first computer system is not provided access to personally identifiable information of the plurality of users absent both permission from respective users and adjustments to scores of respective users.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
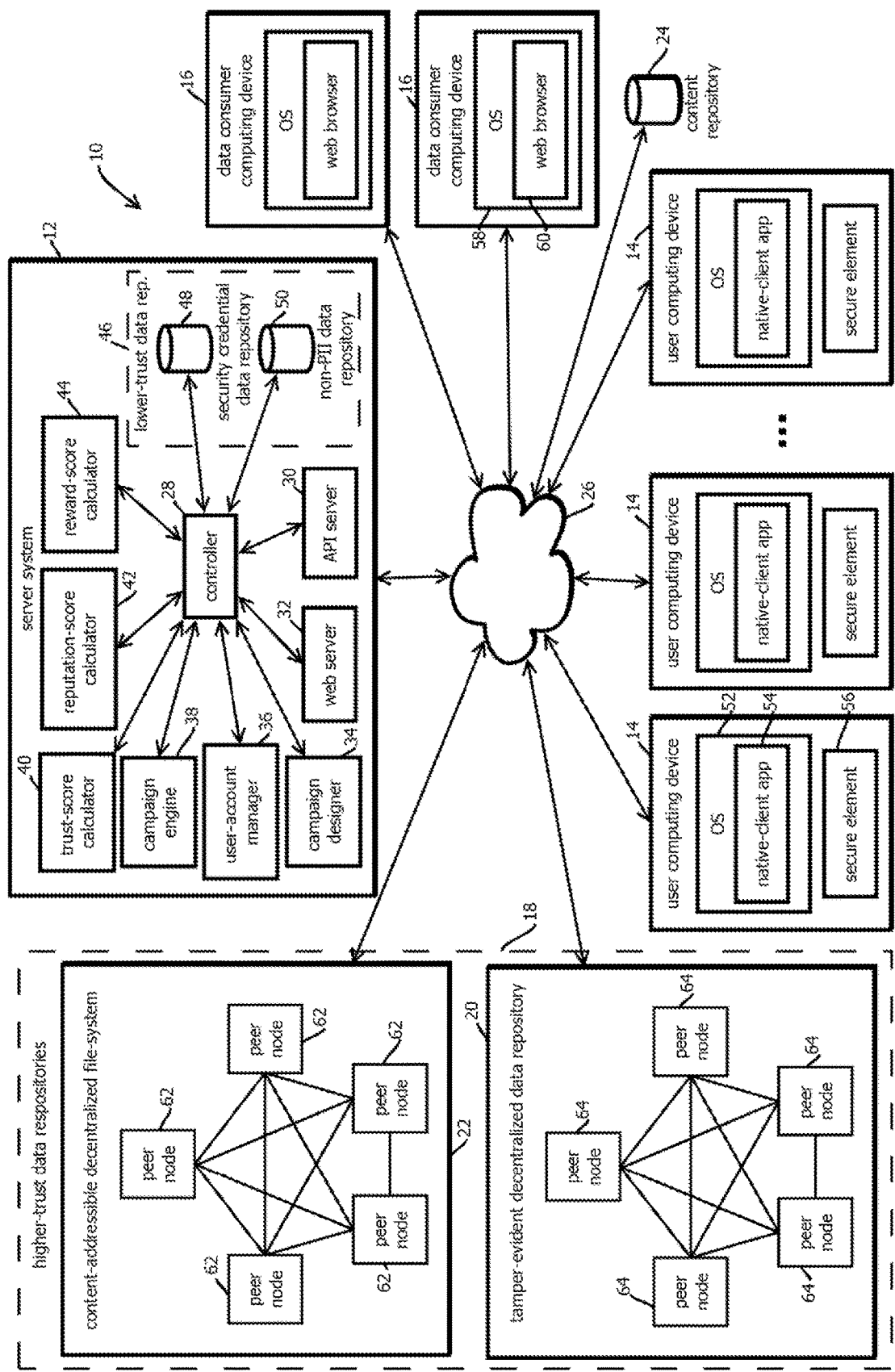
FIG. 1 is a physical and logical architecture block diagram depicting an example of a computing environment in which the present techniques may be implemented in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computer science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments implement a suite of software-implemented tools that create a closed-loop, referral-only, community in which users control and can be rewarded for divulging their personal information. In some embodiments, all users (a term which is used interchangeably with the terms "end-users" or "members") remain anonymous (for example, with only pseudonymous identifiers being exposed, unless members choose to reveal their identity. In some embodiments, the only way those seeking access to this data, called herein "data consumers" (like advertisers and others seeking access to personal information of members or other users), can communicate with end users is via pseudonymous identifiers. The data consumers may be constrained in initial stages of a conversation to non-personally identifiable, less privacy-sensitive, coarser-grained demographic attributes of users, unless users choose to reveal more sensitive, detailed information, in which case users may be compensated in some embodiments. As a result, in some embodiments, the needs of data consumers may still be met by providing a process by which users can be engaged on a relatively selective basis for marketing and other resource-intensive efforts, while users control which information is revealed and are incentivized to participate. That said, a variety of different inventive techniques are described herein, and some embodiments may implement only some of those techniques and not address all of the above-described problems in all embodiments.

A set of challenges related to use of pseudonymous (e.g., anonymous, but consistently applied) identifiers arises from the risk of what is called a "Cybil attack." In such attacks, a threat actor may instantiate a relatively large number of different pseudonymous identities on an application to, for example, harvest rewards for revealing "personal" information of synthetic identities of people that do not exist. Some embodiments mitigate this risk with a trust scoring process described below by which the risk of such attacks are mitigated.

Similarly, another set of challenges relates to reputational constraints that are often less effective when users are anonymous. For example, it has been observed that anonymous usernames often facilitate poor behavior on message boards, while forcing users to post under their real name often leads to more civil behavior. A similar set of forces is expected to arise as an unintended consequence of protecting users' privacy, in some populations, and some embodiments. To mitigate these issues, some embodiments may implement techniques described below to compute a reputation score associated with each pseudonymous identifier, and data consumers and other users may selectively communicate with or otherwise engage in tasks other users based upon these reputation scores, for example, excluding from desirable opportunities, those users with multiple low reputation scores. Again, though, embodiments are not limited to systems that afford the benefits of the trust scores or reputation scores, as other inventive techniques are described that may be used independently, which is not to suggest that any other feature is limiting.

In some embodiments, users may be incentivized to recruit other users to participate in the described distributed application, and in some cases more strongly in particular ways. In some embodiments, users may be rewarded for signing up another user, and in some cases, for purchases by or rewards provided to the recruited user. Some embodiments may include a content distribution system in which user-generated content, like rich media content (e.g., videos, images, audio), is distributed, for example, as a subscription or for purchase or for sharing, and a recruiter user may be rewarded for content sales by a content provider recruit of that recruiter user. Similarly, the recruiter user may be rewarded for content purchases by the recruit of that recruiter user in some embodiments.

Rewards may take a variety of forms. Some embodiments may compute a reward score for each desired action and a reward cost for each requested action of the user. In some cases, reward scores may accumulate across exchanges, like a balance, or in some cases, a distinct reward score may be computed for each exchange, without calculating an aggregate value. In some embodiments, the reward score may be denominated in fiat currency, like US dollars, or in some embodiments, the reward score may be denominated in a cryptocurrency, like a stable coin, a utility token, bitcoin, Ether, various ERC 721 or ERC 725 tokens, or the like. In some embodiments, the reward score may be an in-system-only score that does not serve as a medium of exchange, a store of value, or a unit of account, or in some embodiments, the reward score may serve as any permutation or all of these affordances of money.

Some embodiments have a physical and logical architecture that may provide relatively-secure, resilient, privacy-enhancing features. In some embodiments, an index that maps pseudonymous identifiers of users to encrypted records with personally identifiable information of the respective user may be stored in a blockchain. In some embodiments, pseudonymous identifiers may be paired with addresses of such encrypted records in a file system. In some embodiments, the encrypted records may be stored in a content-addressable decentralized file system, like interplanetary file system (IPFS), Dat, Swarm, and the like. In some embodiments, the encryption keys required to access the encrypted records may remain exclusively on users' computing devices, for example, in memory accessible to a native application executing thereon, and in some embodiments, plaintext forms of these records after encryption may be created exclusively on the mobile computing devices of users, without server-side operations having access to this information absent explicit approval from the user via the native application. That said, a variety of different inventive techniques are described herein, and some embodiments may implement only some of those techniques and not provide all of the above-described benefits.

In some embodiments, these and other techniques may be implemented in a computing environment 10 shown in FIG. 1. In some embodiments, the computing environment 10 may include a server system 12, user computing devices 14, data consumer computing devices 16, a higher-trust set of data repositories 18 including a tamper-evident decentralized data repository 20 and a content-addressable decentralized file-system 22, a content repository 24, and the Internet 26. In some embodiments, these various components may each be implemented on one or more processors, and in some cases on one or more devices like those described below with reference to FIG. 6. In some embodiments, the various illustrated components may be geographically distributed, for example, residing more than 1 km apart, like across the United States or the world.

In some embodiments, the server system 12 may be operated by an entity that hosts the presently described system. The server system 12 may execute the processes described below with reference to FIGS. 2 through 5 to add new members, update their trust scores, update their reputation scores, and facilitate exchanges with data consumers operating data consumer computing devices 16. In some embodiments, the server system 12 and the components thereof may be implemented as a monolithic application, for instance, with different illustrated components implemented as different software modules or processes that communicate with one another, for instance, via function calls, or in some cases, some or all of the components may be implemented as different processes executing concurrently on a single computing device. In some embodiments, some or all of the illustrated components may be implemented as distinct services executing on different network hosts that communicate with one another via messages exchanged via network stacks of the respective hosts, for instance, according to application program interfaces of each of the distinct services. In some embodiments, some or all of these services may be replicated, for instance, behind load balancers, to afford a relatively scalable architecture, in some cases, with elastic scaling that automatically spins up or down new instances based on load. Some embodiments implement a service-oriented architecture, such as a micro services architecture, with different services hosted on virtual machines or containers executing images corresponding to different services, in some cases, with some services implemented in a serverless architecture, for instance, as lambda functions.

Three user computing devices 14 are shown, but commercial implementations are expected to include substantially more, for example, more than 1000, more than 100, 000, more than 1 million, or more than 10 million different user computing devices (e.g., participating in concurrent sessions), in some cases with the same number of users, or in some cases with individual users having multiple user computing devices 14 through which they access the same account. Examples of user computing devices 14 include mobile computing devices, like smart phones, tablets, wearable computing devices, such as head-mounted augmented reality displays, wrist mounted computing devices, smart headphones or earbuds, and the like. Or in some embodiments, the user computing devices 14 may be set-top boxes, in-dash automotive computers, desktops, laptops, and the like.

Similarly, two data consumer computing devices 16 are shown, but commercial implementations are expected to include substantially more, like more than 100, more than 1000, or more than 100,000 data consumer computing devices distributed more than a kilometer apart, like over the United States or the world. Data consumer computing devices 16 may take any of the forms of user computing devices 14 described above. In some embodiments, data consumer computing devices 16 are servers accessing an application program interface (API) of the server system 12, or in some embodiments, the data consumer computing devices 16 are computing devices operated by a human performing various analyses in other tasks to obtain and operate on data obtained via server system 12.

In some embodiments, where and how information is stored may depend upon how personally identifiable that information is. The identifiability of information is measured by the size of a subset of a population that is identified by that information. For example, the genders male and female are not particularly identifiable because they each only identify approximately one half of the population, a large percentage. Similarly, a ZIP Code is not particularly identifiable because it only identifies in many cases around 5 or 10,000 people. In contrast, a attribute like a street name is often relatively personally identifying, as it often only identifies 10 to 50 people. An example of a maximally identifying attribute is something like a Social Security number or driver's license number that uniquely identifies a person within a population and is often associated in public records with the person's name. Similarly, the described pseudonymous identifiers may serve as maximally identifying attributes of users, but the pseudonymous identifiers in some embodiments are not personally identifying values, as a party in possession of such a pseudonymous identifier would not have a way to link that to a person's public identity. In some cases, the result of joins may produce records with substantially more identifiability than the individual attributes therein, e.g., a ZIP Code joined with an age, a hair color, and an occupation may uniquely or nearly uniquely identify an individual. Some embodiments may prevent such joins absent user consent. For example, some embodiments may enforce a minimum set size of joints of 250 to reduce the likelihood of joins being used to identify a single user.

Some embodiments may classify attributes of users into two classes. A less-sensitive class of information may include things like the ZIP Code, age, gender, and pseudonymous identifier. A more-sensitive class of information may include things like phone number, email address, name, street name, street address, Social Security number, driver's license number, occupation, job history, height, weight, hair color, identities and roles of family members, identities of friends, content consumption histories or patterns, purchase histories or patterns, and the like. In some embodiments, information may be classified into the less sensitive class in response to turn determining that the attribute is less personally identifying than some threshold, like 1000 people in a population of the United States, 10,000 people, or 100,000 people or more or less, while information that does not satisfy the threshold may be classified as more-sensitive information.

In some embodiments, more-sensitive attributes may be stored in the higher-trust data repositories 18. In some embodiments, some less-sensitive attributes may be stored here as well, for example, those that are not particularly useful for data consumers seeking to preliminarily segment the population for typical use cases like those described below. The term "trust" as used herein as a label of data repositories does not require a particular state of mind, rather the term serves to distinguish the roles of the different places in which data is stored. In some embodiments, an index of pseudonymous identifiers to ciphertext of records about the user to whom the pseudonymous identifier pertains may be stored in the tamper-evident decentralized data repository 20, with the pseudonymous identifiers being paired with addresses in the content-addressable decentralized file-system 22 (like cryptographic hashes of the ciphertexts). Thus, given a pseudonymous identifier and access to the repository 20, embodiments may then retrieve addresses in the file-system 22 of ciphertext of records about the corresponding user.

In some embodiments, the tamper-evident decentralized data repository 20 is a blockchain or other acyclic graph of cryptographic hash pointers. Cryptographic hash pointers have identifiers of other entries of the graph along with a cryptographic hash of content of the other entry that is identified, and in some cases along with other content. A single entry may have multiple cryptographic hash pointers, like in a tree structure, such as a Merkel tree, like a radix tree in a block of a blockchain. In some embodiments, content written to the tamper-evident data repository may be stored in leaf nodes of such trees. In some embodiments, index entries may be written directly into the leaf nodes, or some embodiments may store a cryptographic hash of index entries in the leaf nodes to render that content tamper evident. Consequently, subsequent cryptographic hash pointers in the data structure may have cryptographic hash values based upon a plurality, and in some cases, all proceeding entries in the data structure. In some cases, a log of transactions with the server system 12 may also be written to the blockchain or another blockchain, e.g., documenting grants of consent, rewards, trust scores, reputation scores, and the like, at various points in time, for instance, responding to mutation.

In some embodiments, the data repository 20 is a blockchain of an Ethereum, EOS, Stellar, Hyperledger, Neo, Cardono, or other blockchain computing platform. In some embodiments, the blockchain is implemented as a public block chain on un-trusted computing devices of a public application-layer network, or in some cases, it may be a private blockchain implemented on computing devices controlled by a single entity or a consortium. In some embodiments, each such computing device executes a peer computing application to form a peer node 64, and in some cases, and particularly on public blockchain implementations, those peer nodes may each store a copy of the tamper-evident decentralized data repository. Peer nodes 64 may execute a consensus algorithm, like Paxinos, Raft, hotstuff, or the like, to determine by consensus a state of the tamper-evident decentralized data repository. In some embodiments, the peer nodes 64 may be required by other peer nodes 64 to demonstrate consumption of some resource to participate in the consensus algorithm, for example, by executing a proof of work by calculating a hash collision to some threshold number of digits, executing a proof of storage process, or providing proof of stake.

In some embodiments, records about (which includes records of) users may be stored in the content-addressable decentralized file-system 22 or other file-systems. Examples of suitable content-addressable decentralized filesystems include interplanetary file system, Dat, and the like, for instance, implemented by a plurality of peer computing applications executing on peer nodes 62. In some embodiments, the file-system is executed on a collection of un-trusted computing devices, for example, in a public implementation of one of these file-systems, or the file system may be implemented on a collection of computing devices by a single entity or consortium. In some embodiments, the file system is a zero knowledge file system with respect to ciphertext stored thereon, in the sense that cryptographic keys to decrypt the ciphertext may not be stored in the file-system, or in some cases in memory accessible to the server system 12, the repository 20, the computing device 16, or other components other than an individual user computing device 14 of an individual user to whom the record in the ciphertext pertains. In some embodiments, the ciphertext are content addressable by a cryptographic hash of the ciphertext. In some cases, content is addressable via Chord or Kademelia distributed hash tables. In some cases, records may be replicated on multiple computing devices to facilitate redundancy, for example, to render a file available even if an individual computing device storing that file drops off the network.

Examples of cryptographic hash functions include MD5, SHA-256, SHA-3, and DSA. Such hash functions are characterized as one-way functions because given an input and a result of the hash function, it is relatively computationally untaxing to verify that the hash function result corresponds to the input (e.g., by re-computing the hash and determining it matches, as such functions are deterministic), but it is relatively computationally expensive and infeasible to determine how to modify a given input to produce a given result or re-create an input given a result, e.g., requiring more than a month or year of computing time for a top-of-the line contemporary consumer-grade CPU.

In some embodiments, records about users may include a plurality of attributes, examples of which are described above and below. In some embodiments, the records may be formed by the server system 12 sending users questions, for example, in the form of forms to populate, and responses may be added in a structured format, like a hierarchical data serialization format, for example, a JSON, YAML, or XML document. In some embodiments, attributes may be extracted from documents provided by users, for example, by executing a natural language processing information extraction algorithm to extract fields from a resume supplied by the user. In some embodiments, the records may include links to other users, for example, in a social network graph, for instance, by pseudonymous identifiers of other users along with a value indicating a nature of the relationship, like family member, friend, spouse, child, coworker, boss, teacher, fellow student, or the like.

The data repositories 20 and 22 in the present example are decentralized. In some embodiments, there is no central authority or single computing device that can be taken off-line to shut down the data repository, thereby rendering the data repositories more resilient. Other implementations may not be decentralized, which is not to suggest that any other feature described herein is limiting. For example, tamper evident records may be implemented in a linked list of time stamped cryptographic hash pointers on a single computing device, and file-systems may be implemented as zero knowledge file-systems on a single computing device. In some embodiments, the index is implemented in a non-tamper-evident form to facilitate mutation, and the file-system is not implemented with a zero-knowledge protocol, which is not to suggest that any other feature described herein is limiting.

In some embodiments, user computing devices may upload user generated content to content repository 24, like music, videos, blogs, microblogs, and the like. In some embodiments, other users may access that content, in some cases paying via the server system 12 to compensate the user that uploaded the content or otherwise causing the reward score of the user that uploaded the content to be adjusted, in some cases by decrementing the reward score of the user acquiring the content by the same amount that the reward score of user that uploaded the content is incremented.

Reference to scores and thresholds herein should be read as being agnostic to sign, provided that the semantic value accords with the description. For example, reference to increasing a trust score in a system in which a higher trust score indicates more trust is warranted should be read as equivalent to decreasing a trust score in a system in which a lower trust score indicates more trust is warranted. Similarly, reference to exceeding a threshold in the former should be read as equivalent to being under the threshold in the latter. In either case, the threshold would be said to have been "satisfied," as that term is used here.

In some embodiments, the server system 12 includes an API server 30, a web server 32, a campaign designer module 34, a user account manager 36, a campaign engine 38, a trust-score calculator 40, a reputation-score calculator 42, a reward-score calculator 44, and a lower-trust data repository 46 having a security credential data repository 48 and a non-personally-identifiable-information data repository 50. In some embodiments, the operation of these components may be coordinated by the controller 28 that executes or otherwise causes execution of the processes described below with reference to FIGS. 2 through 5.

In some embodiments, the controller 28 is replicated as a plurality of instances behind a load balancer, in some cases with each instance supporting a plurality of concurrent sessions with different user computing devices 14 or data consumer computing devices 16. In some embodiments, sessions may be identified by a unique session identifier that is appended to a header of a transport protocol message exchange between computing devices.

In some embodiments, the application program interface server 30 communicates with native application instances executing on the user computing devices 14 and described in greater detail below. In some embodiments, the web server 32 communicates with web browsers executing on the data consumer computing devices 16 to present a portal by which the exchange of information is facilitated between private information of users and data consumers. In some embodiments, the servers 30 and 32 are nonblocking servers monitoring a network socket defined by a port number and IP address and implementing deferreds or promises.

In some embodiments, the campaign designer module 34 may generate user interfaces for presentation on data consumer computing devices 16, like web forms and other webpage content, by which data consumers may specify queries to end users, request tasks of end users, specify budgets for rewards scores to be provided to users for participating in campaigns (e.g., allocating $1,000 to users on a first-come-first-served basis), select responsive users returned by queries, and otherwise configure and incentivize exchanges of information with users. Examples of the criteria that a data consumer may specify for a query through interfaces provided by the campaign designer 34 are described below with reference to FIGS. 2 through 3.

A campaign may be an iterative process by which a data consumer filters or otherwise segments a population of users to engage with a subset of users for compensation in a way that reveals more private information about that subset of users. In some cases, a campaign may have multiple stages, beginning with an initial stage based upon the less-sensitive class of information, in some cases with an initial query and filtering that does not require compensation or consent. An example would be a query requesting users of a particular gender in a particular ZIP Code in a particular age range. Some embodiments may further specify a random sampling of a responsive population, for instance, selecting 10 users at random from a responsive subset.

Subsequent stages of a campaign may further filter the responsive subset based upon more sensitive, private information, following consent and compensation for the implicated users, as described below. As noted, compensation may be implemented with a reward score like that described above. In some embodiments, a subsequent stage of a campaign may be designed in the campaign designer by specifying a query, a number of responses requested, and an amount of compensation in terms of reward scores. In some embodiments, queries may specify one or more criteria. In some embodiments, the criteria relate to minimum thresholds for the below-described trust and reputation scores for users to qualify to respond to the query and receive a reward score adjustment (e.g., incrementing an extant score or creating a new score). In some embodiments, the queries request information stored in a structured or unstructured form in the decentralized filesystem in ciphertext corresponding to a responsive user, for example, associated by the repository 20 with a pseudonymous identifier of the corresponding user.

Examples of campaigns may include surveying, with a plurality of questions, a group of users selected based upon more sensitive information revealed with consent and in exchange for adjustments to reward scores. Other examples include conducting a focus group with a group of users selected in a similar manner. Examples of campaigns include selecting users with these techniques and then compensating those users with reward scores or other mechanisms to view brand advertisements or receive direct offers. Other examples include selecting a group of users potentially qualified to fill a job opening and getting at least some of those users to apply. Campaigns may be staged with multiple uncompensated and compensated stages in some cases drilling down to the strongest leads with increasingly large reward scores for increasingly specific information or burdensome tasks performed by users.

Some embodiments may include a user account manager 36 that creates new user accounts. In some embodiments, upon creating a user account, a user may install a native application like that described below, undergo a process described below with reference to FIG. 5 to increase their trust score, and have a pseudonymous identifier created, for example, with a pseudorandom function followed by an operation to verify that the resulting value is unique and not a currently taken pseudonymous identifier (in which event, a new random value may be created and verified to be unique). Or in some embodiments, pseudonymous identifiers may be created as cryptographic hashes of information supplied by users (e.g., based on their name and social security number).

In some embodiments, during user account creation, users may supply both less and more sensitive types of information via the native application to the server system 12. In some embodiments, some of the more-sensitive types of information described above may be temporarily held in memory of the server system 12 but permanently deleted thereafter. In some embodiments, the less-sensitive types of information described above may be stored in a user profile in the non-personally identifiable information data repository 50 indexed by, or otherwise associated with, the user's pseudonymous identifier. Similarly, account credentials, like a username and password, or cryptographic hash thereof, may be stored indexed by the pseudonymous identifier in the security credential data repository 48.

In some embodiments, after creating an account, a user may supply various information to the server system 12, including structured information responsive to onboarding questions and unstructured information in the form of documents and other content. The uploaded information may be processed and stored in the file-system 22, the data repository 20, or the content repository 24 as appropriate according to the allocations of information described above. In some embodiments, the user-account manager 36 may include a natural language processing information extraction algorithm configured (e.g., trained) to extract various fields from various types of documents, for example, extracting fields like work history records, education history records (like job titles and employment dates) from a resume, and the resulting structure data may be written to a record for the user in a ciphertext in the file-system 22. In some embodiments, a given pseudonymous identifier may be indexed to a plurality of ciphertexts and a plurality of records in the content repository 24 by the data repository 20, or in some cases, the pseudonymous identifier may be indexed to a most current ciphertext, and that ciphertext may include a pointer to address of a previous ciphertext added upon creation of the most current ciphertext, forming a linked list of ciphertexts.

In some embodiments, the plaintext data is encoded in the ciphertext (i.e., in encrypted form) in the file-system 22 may be encrypted by the user computing device 14 from which the information is obtained, such that the plaintext data is not accessible outside of the user computing device 14. In some embodiments, the cryptographic key with which the plaintext data is encrypted may reside on the user's computing device 14, in some cases exclusively and at all times. In some embodiments, the server system 12 may extract various fields from documents with the account-manager 36 and send that data to the corresponding user computing device 14 to be encrypted before being added to a record in the decentralized filesystem 22 at an address indexed to the user's pseudonymous identifier by record in the repository 20. Or in some embodiments, records may be encrypted by the server system 12. In some embodiments, some records are encrypted by the server system 12, while other records are encrypted by the user computing device 14. In some embodiments, encryption may be nested, such that a ciphertext encrypted by the user computing device 14 is then encrypted into another layer of encryption in another ciphertext formed by the server system 12, for example, with a different cryptographic key held exclusively by the server system 12, such that cooperation of both systems is required to access the plaintext. Or in some embodiments, this sequence of nesting may be reversed.

Various types of encryption may be used. In some embodiments, the encryption is symmetric key encryption. In some embodiments, a single cryptographic key is stored on user computing devices 14 and used to encrypt and then decrypt records stored in the file-system 22. Or some embodiments may use asymmetric encryption, for example, with a private cryptographic key maintained on the user computing device 14 and having a public cryptographic key associated in the repository 48 or the repository 50 with the corresponding user's pseudonymous identifier.

In some embodiments, the campaign engine module 38 may execute campaigns. Some embodiments may execute a loop in which the engine 38 accesses a FIFO buffer for new, unprocessed campaigns to begin processing. In some embodiments, the loop or another loop may further process received, unprocessed responses from users and send as of yet unsent messages to users specified by current stages of campaigns. In some embodiments the loop or another loop may further determine whether a current stage of a campaign is completed, for example, all users or a specified number of users have responded, and in response to determining that the stage is complete, advanced the campaign to the next stage, for example, sending out a new round of messages specified during campaign design. Some embodiments may populate a campaign dashboard with metrics indicating amounts of completion of campaigns and stages therein and provide the dashboard to devices 16 for display.

In some embodiments, the trust score calculator 40 may execute the process described below with reference to FIG. 5 to determine trust scores, and the reputation-score calculator 42 may execute the process described below with reference to FIG. 4 to calculate reputation scores, which in some cases may include calculating stage or campaign-specific reliability scores, such that a given pseudonymous identifier is associated with a plurality of reliability scores by which a reputation score is determined.

In some embodiments, the reward-score calculator 44 may increment and decrement rewards scores of users and data consumers, or compute new scores, in accordance with the adjustments described herein.

In some embodiments, the lower-trust data repositories 46 may store data classified as less sensitive in accordance with the approaches described above. Some embodiments may include a security credential data repository 48 storing access credentials, like usernames, pseudonymous identifiers, and salted cryptographic hashes of passwords of user accounts in respective records. Some embodiments may further include a non-personally-identifiable-information data repository 50 storing records with attributes of users classified as being less sensitive in accordance with the approaches described above and keyed or otherwise indexed to pseudonymous identifiers of those users, without being keyed by the server system 12 to non-pseudonymous identifiers of users. In some embodiments, the data repository 50 includes a relational database like a MySQL database storing less-frequently accessed attributes of users and an Elastic Search database storing more-frequently accessed attributes of users. In some embodiments, the latter may afford faster query responses by which subsets of users are identified and then further filtered by application of other query criteria to records in the MySQL database.

In some embodiments, the user computing devices 14 include an operating system 52, like the Android or iOS operating system, and that operating system may execute therein a native-client application instance 54 configured to interface with the other illustrated components via the API server 30 of the server system 12. In some embodiments, the native-client application 54 is downloaded and installed on the user computing devices 14 from a curated set native applications hosted by a provider of the operating system 52 and installed on the user computing device 14. Or some embodiments may side-load the native application 54. In some embodiments, the native application 54 may reveal less about the user computing device 14 and the corresponding user in the communications via the Internet 26 than a web browser, for instance, by omitting fields from a user-agent string, by preventing browser fingerprinting, and executing stateless sessions in some embodiments, e.g., via a Representational State transfer API exposed by the server 30. Or in some embodiments, the API is stateful.

In some embodiments, the cryptographic key used to encrypt records stored in the file-system 22 may be stored in, or encrypted with a cryptographic key stored in, a secure element 56 of the user computing device 14. In some embodiments, the secure element 56 may be a distinct processor relative to a central processing unit executing the operating system 52. The secure element may be accessed via interrupts and may have a memory outside the memory address space of the central processing unit executing the operating system 52 and the native-client application 54 therein to reduce an attack surface of the secure element 52.

In some embodiments, the data consumer computing devices 16 may also execute an operating system 58 and a web browser 60 therein. In some embodiments, campaigns may be designed and responses viewed via user interfaces displayed in the web browser 60 based on instructions from the campaign designer 34 conveyed by the web browser 32. In some embodiments, the server system 12 may maintain in memory a plurality of tenant accounts, each tenant account having a plurality of seats for different data consumers within an organization, and in some cases, each seat may have a plurality of campaigns associated therewith for different employees of the organization to manage their respective campaigns.

Thus, some embodiments may facilitate close-loop, referral only communication between data consumers and users, placing users in control of their private data, and providing a mechanism by which users may be incentivized to share their private data through adjustments to rewards scores. For example, a market researcher may login to a tenant account via a data consumer computing device 16 to view a campaign designer user interface from the designer 34 in their web browser 60. In this portal, the data consumer may enter criteria specifying demographic attributes they are targeting, such as less-sensitive attributes stored in the repository 50. After submission of this first stage of the campaign, the data consumer may receive back a response indicating a number of responsive users, without revealing other information about those users in some embodiments. In some embodiments, the data consumer may then submit another stage of the campaign via the portal specifying a plurality of questions to be sent to the responsive users identified in the first stage and specifying adjustments to a reward score for those users in exchange for answering the questions. A message may be sent to the native application of each of those users, for instance, via Firebase Cloud Messaging based upon an identifier of the native client application instance of those users associated with the pseudonymous identifier in the stage 1 results. That message may invite those users to participate in stage 2 of the survey by answering the questions and receiving the specified reward score adjustment.

A subset of those messaged users may provide results which may be associated with their pseudonymous identifier and provided to the data consumer. The data consumer may then specify via the portal a third stage of the campaign to be applied to a subset of the users that provided results consistent with the data consumer's objective, for example, targeting those users that gave a particular answer to one of the questions. The third stage may specify various actions to be performed by the users and compensation in the form of rewards score adjustments to be provided in exchange for those actions, like viewing an advertisement, applying for a job, participating in market research, or the like. This third stage invitation may be sent to the user computing devices 14 via an approach like that used to send the second stage message. The staged approach is expected to yield larger rewards for users, as data consumers are expected to have relatively high confidence in the quality of leads in later rounds.

Figure 2:
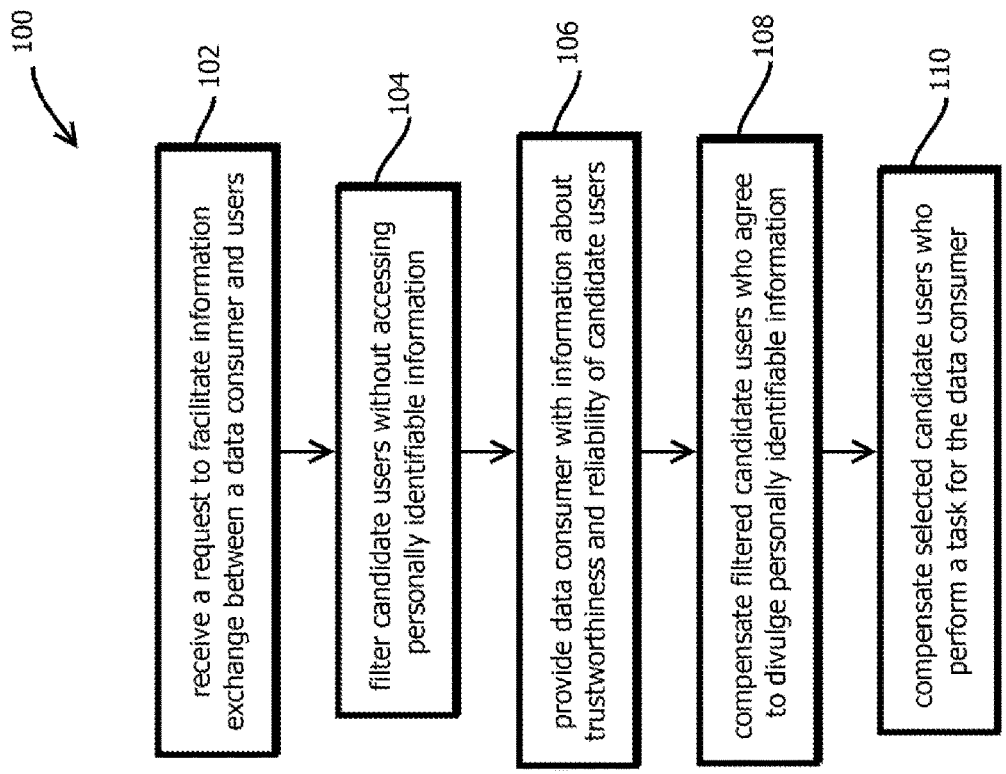
FIG. 2 is a flowchart depicting an example of a process by which information may be exchanged between data consumers and users in accordance with some embodiments of the present techniques.

FIG. 2 illustrates an example of a process 100 performed by the server system 12 described above, though the process is not limited to that implementation, which is not to suggest that any other feature described herein is limiting. In some embodiments, the process 100 and the other functionality described herein may be implemented with program code or other instructions stored on a tangible, non-transitory, machine-readable medium, such that when the instructions are executed by one or more processors (a term which as used herein refers to physical processors, e.g., implemented on a semiconductor device), the described functionality is effectuated. In some embodiments, notwithstanding use of the singular term "medium," the medium may be distributed, with different subsets of the instructions stored on different computing devices that effectuate those different subsets, an arrangement consistent with use of the singular term "medium" along with monolithic applications on a single device. In some embodiments, the described operations may be executed in a different order, some or all of the operations may be executed multiple times, operations may be executed concurrently with one another or multiple instances of the described process, additional operations may be inserted, operations may be omitted, operations may be executed serially, or the processes described may otherwise be varied, again none of which is to suggest that any other description herein is limiting.

In some embodiments, the process 100 includes receiving a request to facilitate information exchange between a data consumer and users, as indicated by block 102. In some embodiments, this request may be received in the form of a submission in a web form in a portal configuring a campaign or stage thereof from one of the data consumer computing devices 16.

Next, some embodiments may filter candidate users without accessing personally identifiable information of those users, as indicated by block 104. In some embodiments, this may include executing a query to identify responsive pseudonymous identifiers of responsive users in the non-personally-identifiable-information data repository 50.

Next, some embodiments may provide the data consumer with information about trustworthiness and reliability of those candidate users responsive to the query, as indicated by block 106. In some cases, this information may take the form of filtering out those with scores that fail to satisfy criteria, which in some cases may be specified by the query, or some embodiments may indicate the scores to the data consumer, to allow the data consumer to select among users explicitly based on the scores.

Some embodiments may compensate filtered candidate users who agree to divulge personally identifiable information, as indicated by block 108. In some embodiments, this may involve the second and subsequent stages of campaigns described above.

Next, some embodiments may compensate selected candidate users who perform a task for the data consumer, as indicated by block 110. Again, examples of such actions are described above, and the compensation may take the form of adjustments to reward scores like those described above. The resulting adjusted rewards scores may be stored in memory. In some embodiments, adjustments to reward scores may be effectuated by accessing a payment processing system that causes fiat currency to be added to a user's bank account, electronic wallet, or prepaid credit card, or some embodiments may effectuate transfers via a smart contract to transfer cryptographic tokens to a user's wallet account.

Figure 3:
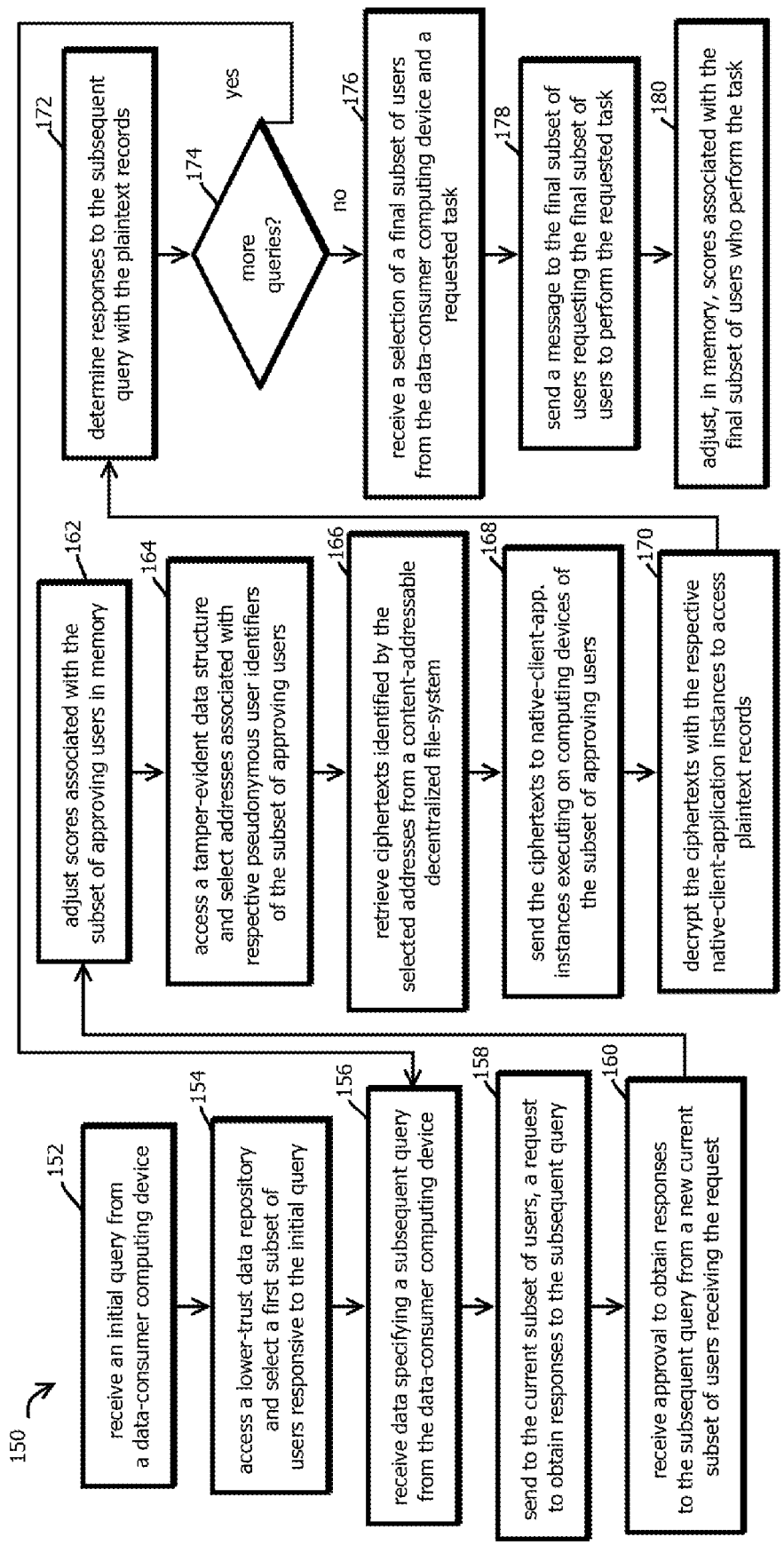
FIG. 3 is a flowchart depicting another example of a process by which information may be exchanged between data consumers and users in accordance with some embodiments of the present techniques.

FIG. 3 shows an example of a process 150 performed by the server system 12 described above, though again the process is not limited to that implementation, which again is not to suggest that any other feature described herein is limiting. In some embodiments, the process 150 includes receiving an initial query from a data-consumer computing device, as indicated by block 152. Some embodiments may then, in response, access a lower-trust data repository and select a first subset of users responsive to the initial query, as indicated by block 154. Some embodiments may then provide information about the responsive users, ranging from a count or other group statistics (e.g., measures of central tendency of various attributes, like mean, median, or mode, or measures of variation, like variance or standard deviation) of, or values of, attributes thereof, to the data-consumer computing device, before receiving data specifying a subsequent query from the data-consumer computing device, as indicated by block 156. In some embodiments, the subsequent query may select among the users responsive to the previous query to identify subset and drill down or otherwise segment the group of users.

Some embodiments may then send to the current subset of users, to their native-client-application instances, a request to obtain responses to the subsequent query, as indicated by block 158. In some embodiments, this request may cause the native applications to present a user interface with inputs presenting the amount of the reward and the scope of information or task requested. This user interface, which in some cases may be presented as a series of displays that evolve over time based on input, may include an input element by which the user declines the request or accepts the request.

Responsive to the user's acceptance, some embodiments may receive approval to obtain responses to the subsequent query from a new current subset of users who received the request and approved, as indicated by block 160. In some embodiments, the responses include information obtained from the higher-trust data repositories 18 described above, and in some cases, the responses include information obtained directly from the user, for example, in the form of answers to questions.

Next, some embodiments may adjust scores associated with the subset of approving users in memory, as indicated by block 162. Some embodiments may then access a tamper-evident data structure and select addresses associated with respective pseudonymous user identifiers of the subset of approving users, as indicated by block 164, and retrieve ciphertexts identified by the selected addresses from a content-addressable decentralized file-system, as indicated by block 166. In some embodiments, these operations may include accessing the repositories in the higher-trust data repositories 18 described above with reference to FIG. 1.

Some embodiments may send the ciphertext to the native-client-application instances executing on computing devices of the subset of approving users, as indicated by block 168. In some embodiments, the ciphertext are requested from the repository 22 by the native-client application 54, without the ciphertext passing through the server system 12, or in some embodiments, the request is made by the server system 12 and the ciphertext is routed through the server system 12 to the native client applications 54. In some embodiments, only those ciphertext pertaining to the respective user having a given user computing device 14 are provided to that computing device 14. Thus, a plurality of different ciphertexts may be accessed for a plurality of different users, and the different ciphertexts may be routed to different user computing devices 14.

Some embodiments may then decrypt the ciphertext with the respective native-client-application instances to access plaintext records therein, as indicated by block 170. In some embodiments, this may include accessing a symmetric cryptographic key with which the ciphertext were encrypted via a secure element 56 on the user computing devices 14 described above with reference to FIG. 1.

Some embodiments may determine responses to the subsequent query with the plaintext records, as indicated by block 172. In some embodiments, this may include interrogating the plaintext records, for instance, with a JSONquery or XPath query, on the user computing device 14 with the native-client-application instance, or in some cases a subset or all of the records may be sent to the server system 12 for the server system 12 to determine responses. In some embodiments, the responses may be encrypted with a public cryptographic key of the data consumer stored in association with a tenant account of the data consumer, and the data consumer may decrypt the record with a private cryptographic key corresponding to the public cryptographic key stored on the data consumer's computing device 16. In some embodiments, some or all of these responses are provided directly to the data consumer computing device 16 from a user computing device 14, without passing through the server system 12, or in some embodiments the records are passed through the server system 12, in some cases only in encrypted form, for instance, encrypted with the public cryptographic key of the receiving data consumer, such that the server system 12 does not have access to the plaintext form of the response.

Some embodiments may determine whether there are more queries or other stages in a campaign, as indicated by block 174. Upon determining that there are more, some embodiments may return to block 156 to repeat the above-described operations. Alternatively, upon determining that there are no more queries, some embodiments may proceed to block 176 and receive a selection of a final subset of users from the data-consumer computing device and a requested task. In some embodiments, the requested task may also include a specified rewards score adjustment. In some cases, the same adjustment is specified for all users, or in some embodiments, campaign designer may apply different rewards to different users based upon the desirability of the users.

Some embodiments may send a message to the final subset of users requesting the final subset of users to perform the requested task, as indicated by block 178. In some embodiments, this request may further inform the user of the proposed reward score adjustment to be made responsive to performing the task.

Some embodiments may adjust, in memory, scores associated with the final subset of users who perform the task, as indicated by block 180.

Figure 4:
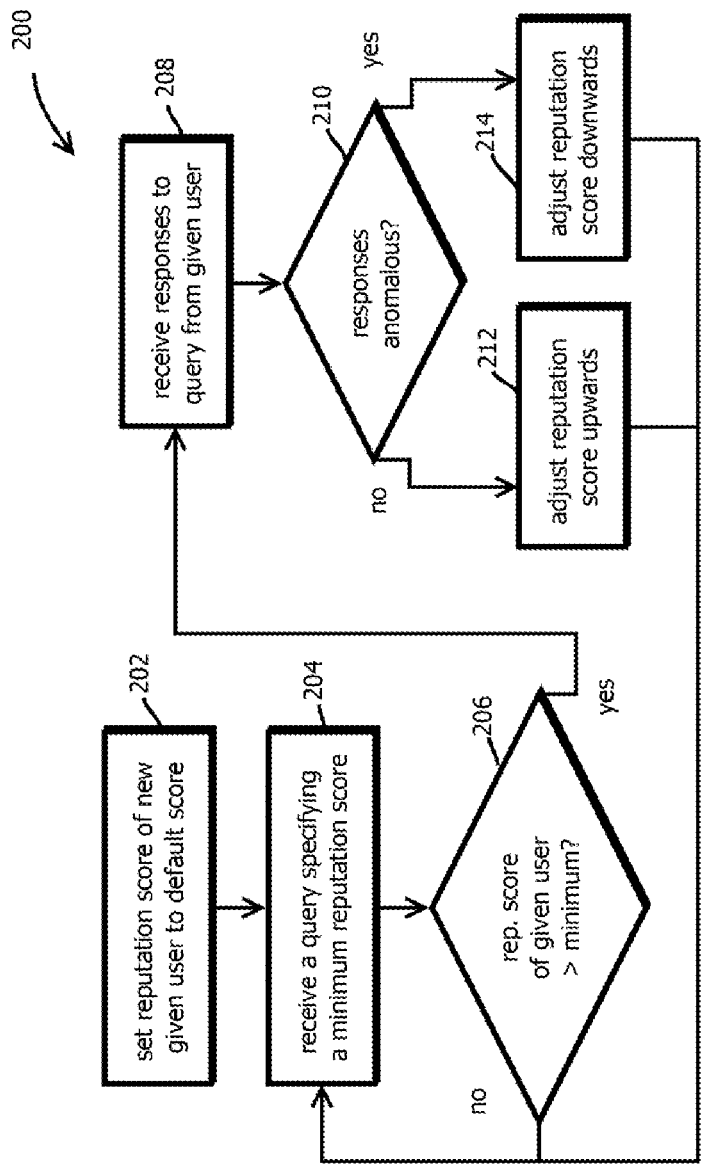
FIG. 4 a flowchart depicting an example of a process by which a reputation score is computed in accordance with some embodiments of the present techniques.

FIG. 4 shows an example of a process 200 to compute a reputation score of the user. In some embodiments, the process 200 may be performed by the server system 12 in cooperation with future computing devices 14, though embodiments are not limited to that implementation, which is not to suggest that any other feature described herein is limiting. In some embodiments, the process 200 includes setting a reputation score of a new given user to a default score, as indicated by block 202. Next, some embodiments may receive the query specifying a minimum reputation score, as indicated by block 204, for example, in a stage of a campaign requesting users with at least a threshold reputation score. Next, embodiments may determine whether the given user's reputation score satisfies the minimum, as indicated by block 206. Upon determining it does not, embodiments may return to block 204 to wait for the next query. Alternatively, upon determining that it does, embodiments may proceed to block 208 and receive responses to the query from the given user.

Some embodiments may determine whether the responses are anomalous, as indicated by block 210. In some embodiments, this may include applying a machine learning model to the responses to determine whether the responses are anomalous. In some embodiments, an unsupervised learning model may be applied to user attributes to cluster users, for example, with DBSCAN, and users classified as outliers upon providing their response may have their response designated as anomalous. In some embodiments, a machine learning model may be trained by the trust-score calculator 40 and downloaded to the native-client applications 54 for classification on-device, to prevent the need to send responses to the server system 12, or some embodiments may send responses to the server system 12 for classification. In some embodiments, responses may be classified as anomalous based upon the responses being labeled as such by the data consumer ex post.

Upon determining that the response is not anomalous, embodiments may adjust the reputation score upwards, as indicated by block 212, or upon determining that the response is anomalous, embodiments may adjust the reputation score downwards, as indicated by block 214. The adjusted reputation score may be stored in memory, before returning to block 204 for the next query. In some embodiments, scores for a given individual for a given campaign, stage, or task may be assigned a reliability score, and the reputation score may be based upon a collection of these reliability scores, which in some cases may be adjusted with weighting based on freshness, for instance, by applying a half-life down waiting so that more recent scores are given a greater waiting. Some embodiments may further weight reliability scores based on a measure of how anomalous a response is determined to be, e.g., a distance between the response from a convex hull or centroid of a nearest cluster in a continuous vector space representation of past responses of a population of users.

Figure 5:
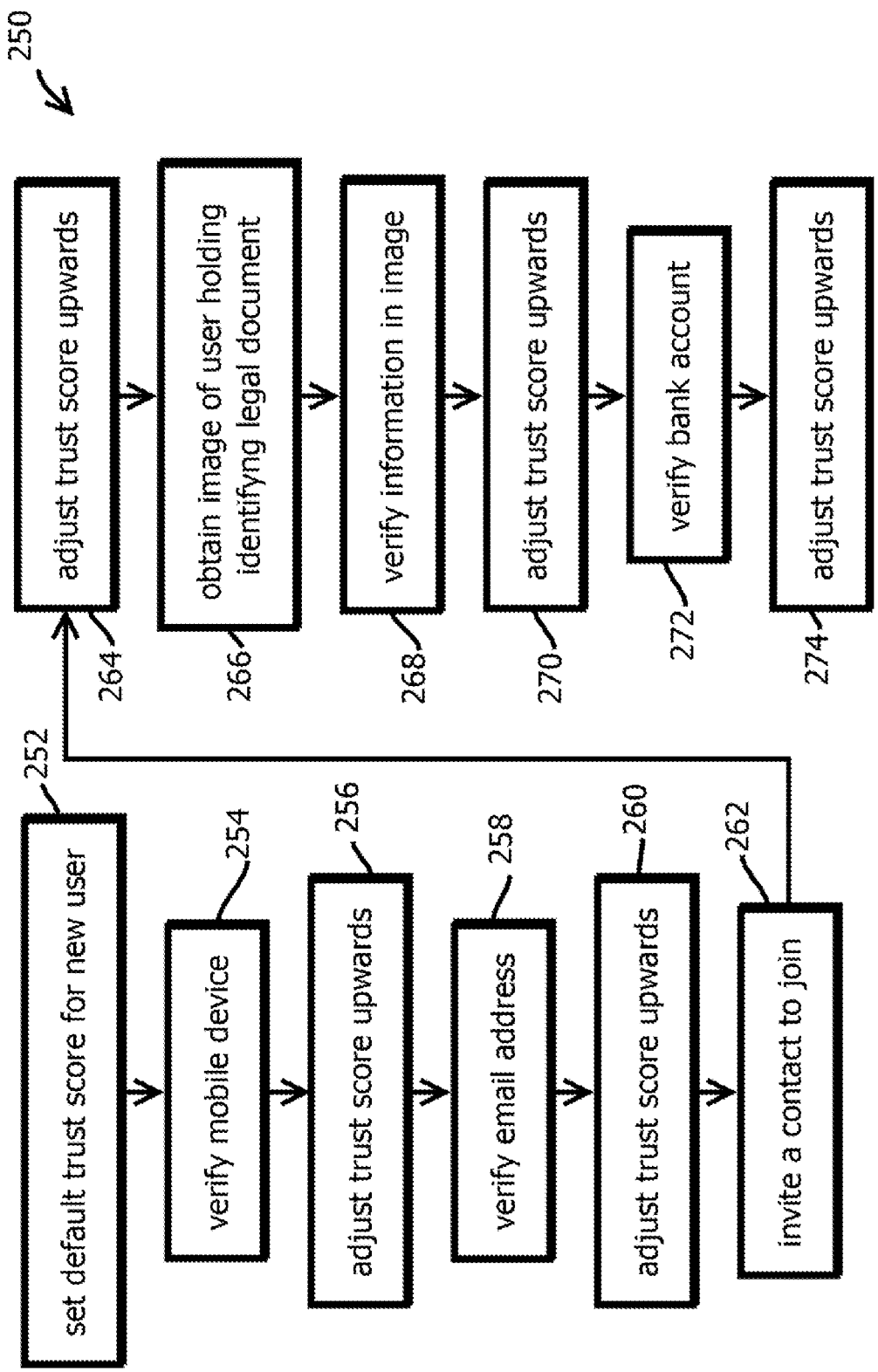
FIG. 5 is a flowchart depicting an example of a process by which a trust score is computed in accordance with some embodiments of the present techniques.

FIG. 5 illustrates an example of a process 250 by which a trust score may be computed for a given user in some embodiments. The process 250 may be implemented with the above-described server system 12, though embodiments are not limited to that implementation, which is not to suggest that any other feature described herein is limiting. In some embodiments, the process 250 may begin with setting a default trust score for new user, as indicated by block 252, for example, upon a user initiating the registration process. Next, some embodiments may verify a mobile device of the user, as indicated by block 254. In some embodiments, verifying may include sending a random or pseudorandom value with greater than one byte, two bytes, four bytes, or eight bytes of entropy to the mobile device, for example, texting a message with a four or six digit random value to the mobile device or sending it to the native client application instance being registered. Then the user may provide the value to the server system 12 or provide a cryptographic hash of the value to the server system 12 to demonstrate possession of the value. Upon the user supplying proof of possession of the value, embodiments may adjust the trust score upwards, as indicated by block 256 in response.

Next, some embodiments may verify an email address of the user, as indicated by block 258. A similar process may be applied by sending a code of some threshold level of entropy (like those listed above) to the email address and asking the user to supply the code to the server system 12. Some embodiments may send an email with a hypertext link that upon being selected causes a user computing device to send the code, for example, as a query parameter in a URL. Upon the email address being verified, some embodiments may adjust the trust score upwards, as indicated by block 260.

In some embodiments, the native-client-application instance may be granted access to a user's contacts on their phone, and some embodiments may provide a user interface by which a user may invite a contact to join, as indicated by block 262, causing a message to be sent to the user with a link to download the native application. Upon the user inviting a contact to join, or upon the user successfully having a contact register, some embodiments may adjust the trust score upwards, as indicated by block 264.

Some embodiments may obtain an image of the user holding an identifying legal document, as indicated by block 266, for example, with a frontward facing camera of the user's mobile computing device being controlled by the native-client-application instance to capture a "selfie." The legal document may take a variety of different forms, like driver's licenses, birth certificates, utility bills, or the like. In some embodiments, the document includes text with a non-synonymous identifier of the user, and that text may be depicted in the captured image. Some embodiments may execute a computer vision algorithm to detect the document, define a first region of the image containing the detected document (e.g., a bounding box), then detect text in the document in a second region (e.g., a nested bounding box), perform optical character recognition on pixels in the second region, and output detected text including the user's non-pseudonymous identifier. Some embodiments may verify that that extracted text corresponds to user provided information (which in some cases may be subsequently deleted by the server system and written to a ciphertext in the file-system 22 described above with reference to FIG. 1). Upon verifying the information in the image, as indicated by block 268, some embodiments may adjust the trust score upwards, as indicated by block 270.

Some embodiments may then verify the user's bank account, as indicated by block 272. In some embodiments, the user may be prompted to supply via the native client application a routing number, an identifier of a bank, and an account number, and some embodiments may send a pre-note to the financial institution and reward trust points if there are no issues. Upon a confirmatory result from the pre-note, some embodiments may designate the user's bank account as having been verified and adjust the trust score upwards, as indicated by block 274. In some embodiments, a user's rewards score may similarly be updated to be adjusted upwards responsive to various thresholds being exceeded by trust scores.

Figure 6:
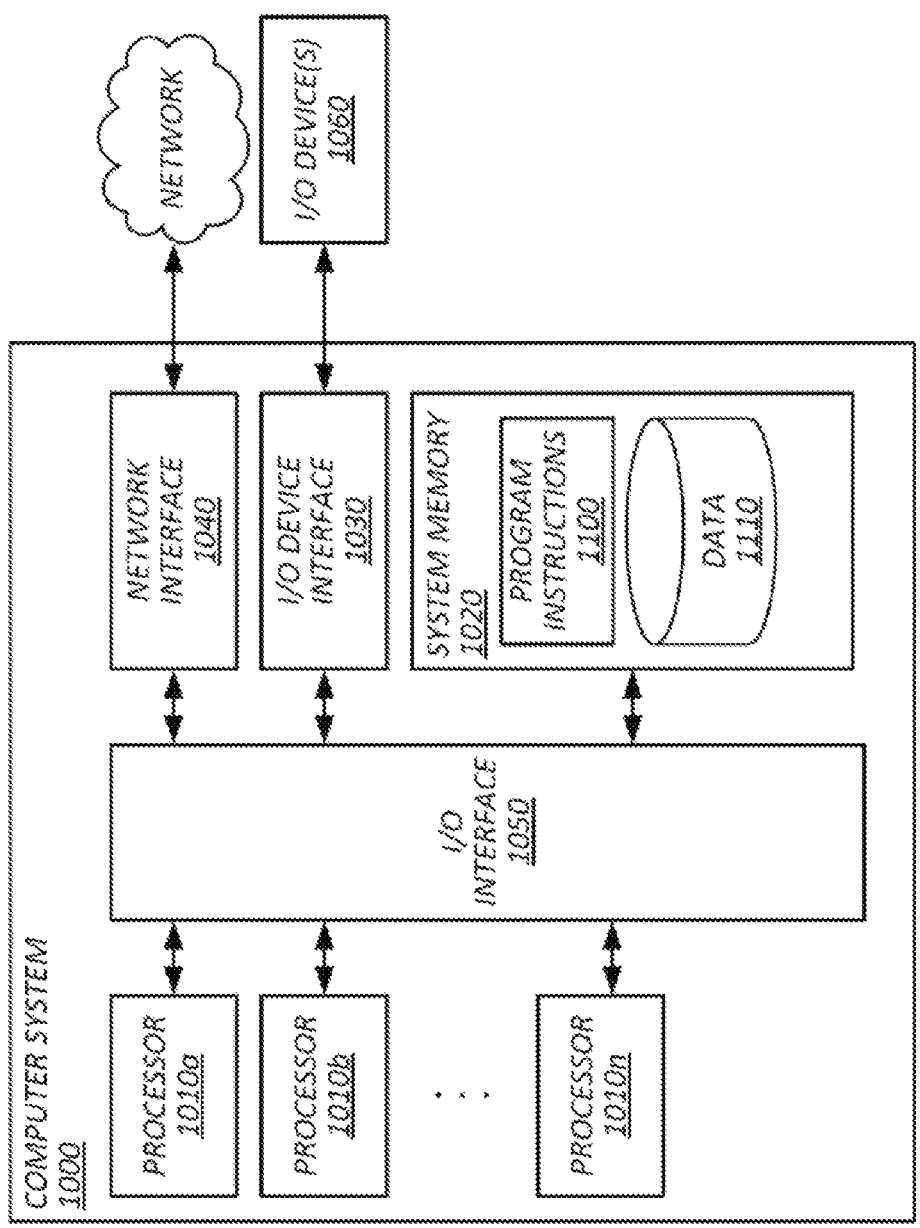
FIG. 6 is an example of a computing device by which the present techniques may be implemented.

FIG. 6 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: receiving, with a server system, via a network, a first query from a first computer system of an entity seeking to acquire information about users, wherein the first query comprises criteria specifying a first class of attributes of users; in response to the first query, accessing a first data repository and selecting a first subset of users from a set of users having information in the first data repository, wherein: first subset of users are selected based on the first subset of users having attributes that satisfy the criteria; and the first data repository comprises a plurality of user records each comprising: a respective pseudonymous user identifier, and a respective plurality of non-personally identifiable attributes of a respective user; receiving, with the server system, via the network, from the first computer system, data specifying a second query, wherein: the second query requests a second class of attributes of users, and the second class of attributes are more personally identifying among the set of users than the first class of attributes; based on selecting the first subset of users and receiving the data specifying the second query, sending, with the server system, via the network, to native-client-applications executing on user computing devices of at least some of the first subset of users, a request to obtain responses to the second query; receiving, with the server system, from the native-client-applications of a second subset of users among the first subset of users, approval to obtain responses to the second query; in response to receiving approval, adjusting, with the server system, respective scores associated with the second subset of users and providing responses to the second query to the first computer system, wherein at part of at least some of the responses to the second query are provided, at least in part, by: accessing a tamper-evident data structure that associates pseudonymous user identifiers of respective users with respective addresses of respective ciphertexts and selecting addresses in response to the respective addresses being associated in the tamper-evident data structure with respective pseudonymous user identifiers of at least some users in the second subset of users; retrieving ciphertexts identified by the selected addresses from a decentralized second data repository, the decentralized second data repository being different from the tamper-evident data structure and the first date repository; decrypting, to form plaintext records, respective ciphertexts with respective native-client-application instances executing on user computing devices of users among the second subset of users, wherein: different native-client-application instances have access to different encryption keys of different ones of the respective ciphertexts, and the server system does not have access to the encryption keys; and determining the at least part of the at least some of the responses to the second query with the plaintext records; and storing, with the server system, the adjusted scores in memory, wherein: the first computer system is not provided access to personally identifiable information of the plurality of users absent both permission from respective users and adjustments to scores of respective users.

2. The medium of embodiment 1, the operations comprise: determining a first value indicative of a reputation of a given user in the first subset or the second subset, the reputation being based on behavior of the given user in exchanges of information mediated at least in part by the server system; and providing information about the first value to the first computer system.

3. The medium of embodiment 2, wherein determining the first value indicative of reputation comprises: determining a plurality of instances of a second value indicative of reliability of the given user in a plurality of past exchanges of information mediated at least in part by the server system; and determining the first value based on the plurality of instances of the second value indicative of reliability of the given user.

4. The medium of embodiment 2, wherein determining the first value indicative of reputation comprises: classifying a response of the given user in an exchange of information mediated at least in part by the server system as inaccurate with an anomaly-detection machine learning model; and in response, adjusting the first value to indicate a diminished reputation relative to before the adjusting.

5. The medium of any one of embodiments 1-4, the operations comprise: determining a value indicative of whether a given user is a human presenting their real identity; and adjusting the score of the given user in response to determining the value satisfies a criterion.

6. The medium of embodiment 5, wherein determining the value indicative of whether the given user is a human presenting their real identity comprises: determining that a collection of attributes of a mobile computing device of the given user do not match any of collections of attributes of previously registered mobile computing devices and, in response, adjusting the value to indicate it is more likely, relative to before the adjusting, the given user is a human presenting their real identity.

7. The medium of embodiment 5, wherein determining the value indicative of whether the given user is a human presenting their real identity comprises: sending an email to an email address provided by the given user or text message to a phone number provided by the given user, the email or text message including a code with more than two bytes of entropy; receiving a message from the given user that demonstrates possession of the code; and in response, adjusting the value to indicate it is more likely, relative to before the adjusting, the given user is a human presenting their real identity.

8. The medium of embodiment 5, wherein determining the value indicative of whether the given user is a human presenting their real identity comprises: obtaining an image of the given user holding a document with an identifier; detecting and locating, with a computer vision algorithm, a region of the image with the identifier; performing optical character recognition based on pixels in the region to extract the identifier; and determining that the extracted identifier matches an identifier provided by the user during registration and, in response, adjusting the value to indicate it is more likely, relative to before the adjusting, the given user is a human presenting their real identity.

9. The medium of embodiment 5, wherein determining the value indicative of whether the given user is a human presenting their real identity comprises: receiving a bank account number and routing number from the given user; performing a pre-note test; and receiving a message indicating the bank account number and the routing number are for a valid account and, in response, adjusting the value to indicate it is more likely, relative to before the adjusting, the given user is a human presenting their real identity.

10. The medium of any one of embodiments 1-9, the operations comprising: receiving, with the server system, a request to add a new user, the request to add the new user being associated with an existing user; and adjusting the score of the existing user based on score adjustments caused by the new user.

11. The medium of embodiment 10, wherein the score adjustments caused by the new user comprise: adjustments at a first rate to the score of the existing users caused by another user consuming content provided by the new user; and adjustments at a second rate, different from the first rate, to the score of the existing users caused by the new user consuming content provided by others.

12. The medium of any one of embodiments 1-11, comprising: after providing responses to the second query to the first computer system, receiving, from the first computer system, via the network, a selection of a third subset of users among the second subset of users; and in response to the selection of the third subset of users, sending, with the server system, via the network, to native-client-application instances executing on user computing devices of at least some of the third subset of users, a requested action specifying an adjustment to scores of respective users to be made based on execution of the requested action.

13. The medium of embodiment 12, wherein: the requested action comprises steps for performing an action requested of a user; and the adjusting the score comprises steps for keeping score.

14. The medium of any one of embodiments 1-13, wherein: the first class of user attributes includes: ZIP codes of residential addresses of users, gender of users, and age of users; the first class of user attributes does not include: street names of the residential addresses, street numbers of the residential addresses, phone numbers of users, names of users, and email addresses of users; the second class of user attributes includes: names of users, street names of the residential addresses, street numbers of the residential addresses, phone numbers of users, and email addresses of users; and the server system does not have access to the second class of user attributes after creation of user accounts.

15. The medium of any one of embodiments 1-14, wherein: the tamper-evident data structure comprises a cryptographic hash tree having leaf nodes that index pseudonymous user identifiers to addresses of the ciphertexts.

16. The medium of embodiment 15, wherein: the tamper-evident data structure comprises a linked list of cryptographic hash pointers based on a cryptographic hash of a root node of the cryptographic hash tree.

17. The medium of any one of embodiments 1-16, wherein: the tamper-evident data structure is replicated on a plurality of computing devices and state of the tamper-evident data structure is determined by consensus among the plurality of computing devices.

18. The medium of any one of embodiments 1-17, wherein: the addresses are, or are associated with, hash values of a distributed hash table.

19. The medium of any one of embodiments 1-18, wherein: the ciphertexts are encrypted with symmetric encryption; and the decentralized second data repository is a zero-knowledge data repository with respect to plaintext of the ciphertexts.

20. A method comprising: the operations of any one of embodiments 1-19.

21. A system, comprising: one or more processors; and memory storing instructions that when executed by the processors cause the processors to effectuate operations comprising: the operations of any one of embodiments 1-19.

What is claimed is:

1. A tangible, non-transitory, machine-readable medium storing instructions that when executed by one or more processors effectuate operations comprising:
   receiving, with a server system, via a network, a first query from a first computer system of an entity seeking to acquire information about users,
      wherein the first query comprises criteria specifying a first class of attributes of users;
   in response to the first query, accessing a first data repository and selecting a first subset of users from a set of users having information in the first data repository, wherein:
      first subset of users are selected based on the first subset of users having attributes that satisfy the criteria; and
      the first data repository comprises a plurality of user records each comprising:
         a respective pseudonymous user identifier, and
         a respective plurality of non-personally identifiable attributes of a respective user;
   receiving, with the server system, via the network, from the first computer system, data specifying a second query, wherein:
      the second query requests a second class of attributes of users, and
      the second class of attributes are more personally identifying among the set of users than the first class of attributes;
   based on selecting the first subset of users and receiving the data specifying the second query, sending, with the server system, via the network, to native-client-applications executing on user computing devices of at least some of the first subset of users, a request to obtain responses to the second query;
   receiving, with the server system, from the native-client-applications of a second subset of users among the first subset of users, approval to obtain responses to the second query;
   in response to receiving approval, adjusting, with the server system, respective scores associated with the second subset of users and providing responses to the second query to the first computer system, wherein at part of at least some of the responses to the second query are provided, at least in part, by:
      accessing a tamper-evident data structure that associates pseudonymous user identifiers of respective users with respective addresses of respective ciphertexts and selecting addresses in response to the respective addresses being associated in the tamper-evident data structure with respective pseudonymous user identifiers of at least some users in the second subset of users;
      retrieving ciphertexts identified by the selected addresses from a decentralized second data repository, the decentralized second data repository being different from the tamper-evident data structure and the first date repository;
      decrypting, to form plaintext records, respective ciphertexts with respective native-client-application instances executing on user computing devices of users among the second subset of users, wherein:
         different native-client-application instances have access to different encryption keys of different ones of the respective ciphertexts, and
         the server system does not have access to the encryption keys; and
      determining the at least part of the at least some of the responses to the second query with the plaintext records; and
   storing, with the server system, the adjusted scores in memory, wherein:
      the first computer system is not provided access to personally identifiable information of the plurality of users absent both permission from respective users and adjustments to scores of respective users.

2. The medium of claim 1, the operations comprise:
   determining a first value indicative of a reputation of a given user in the first subset or the second subset, the reputation being based on behavior of the given user in exchanges of information mediated at least in part by the server system; and
   providing information about the first value to the first computer system.

3. The medium of claim 2, wherein determining the first value indicative of reputation comprises:
   determining a plurality of instances of a second value indicative of reliability of the given user in a plurality of past exchanges of information mediated at least in part by the server system; and
   determining the first value based on the plurality of instances of the second value indicative of reliability of the given user.

4. The medium of claim 2, wherein determining the first value indicative of reputation comprises:
   classifying a response of the given user in an exchange of information mediated at least in part by the server system as inaccurate with an anomaly-detection machine learning model; and
   in response, adjusting the first value to indicate a diminished reputation relative to before the adjusting.

5. The medium of claim 1, the operations comprise:
   determining a value indicative of whether a given user is a human presenting their real identity; and
   adjusting the score of the given user in response to determining the value satisfies a criterion.

6. The medium of claim 5, wherein determining the value indicative of whether the given user is a human presenting their real identity comprises:
   determining that a collection of attributes of a mobile computing device of the given user do not match any of collections of attributes of previously registered mobile computing devices and, in response, adjusting the value to indicate it is more likely, relative to before the adjusting, the given user is a human presenting their real identity.

7. The medium of claim 5, wherein determining the value indicative of whether the given user is a human presenting their real identity comprises:
sending an email to an email address provided by the given user or text message to a phone number provided by the given user, the email or text message including a code with more than two bytes of entropy;
receiving a message from the given user that demonstrates possession of the code; and
in response, adjusting the value to indicate it is more likely, relative to before the adjusting, the given user is a human presenting their real identity.

8. The medium of claim 5, wherein determining the value indicative of whether the given user is a human presenting their real identity comprises:
obtaining an image of the given user holding a document with an identifier;
detecting and locating, with a computer vision algorithm, a region of the image with the identifier;
performing optical character recognition based on pixels in the region to extract the identifier; and
determining that the extracted identifier matches an identifier provided by the user during registration and, in response, adjusting the value to indicate it is more likely, relative to before the adjusting, the given user is a human presenting their real identity.

9. The medium of claim 5, wherein determining the value indicative of whether the given user is a human presenting their real identity comprises:
receiving a bank account number and routing number from the given user;
performing a pre-note test; and
receiving a message indicating the bank account number and the routing number are for a valid account and, in response, adjusting the value to indicate it is more likely, relative to before the adjusting, the given user is a human presenting their real identity.

10. The medium of claim 1, the operations comprising:
receiving, with the server system, a request to add a new user, the request to add the new user being associated with an existing user; and
adjusting the score of the existing user based on score adjustments caused by the new user.

11. The medium of claim 10, wherein the score adjustments caused by the new user comprise:
adjustments at a first rate to the score of the existing users caused by another user consuming content provided by the new user; and
adjustments at a second rate, different from the first rate, to the score of the existing users caused by the new user consuming content provided by others.

12. The medium of claim 1, comprising:
after providing responses to the second query to the first computer system, receiving, from the first computer system, via the network, a selection of a third subset of users among the second subset of users; and
in response to the selection of the third subset of users, sending, with the server system, via the network, to native-client-application instances executing on user computing devices of at least some of the third subset of users, a requested action specifying an adjustment to scores of respective users to be made based on execution of the requested action.

13. The medium of claim 12, wherein:
the requested action comprises steps for performing an action requested of a user; and
the adjusting the score comprises steps for keeping score.

14. The medium of claim 1, wherein:
the first class of user attributes includes:
ZIP codes of residential addresses of users,
gender of users, and
age of users;
the first class of user attributes does not include:
street names of the residential addresses,
street numbers of the residential addresses,
phone numbers of users,
names of users, and
email addresses of users;
the second class of user attributes includes:
names of users,
street names of the residential addresses,
street numbers of the residential addresses,
phone numbers of users, and
email addresses of users; and
the server system does not have access to the second class of user attributes after creation of user accounts.

15. The medium of claim 1, wherein:
the tamper-evident data structure comprises a cryptographic hash tree having leaf nodes that index pseudonymous user identifiers to addresses of the ciphertexts.

16. The medium of claim 15, wherein:
the tamper-evident data structure comprises a linked list of cryptographic hash pointers based on a cryptographic hash of a root node of the cryptographic hash tree.

17. The medium of claim 1, wherein:
the tamper-evident data structure is replicated on a plurality of computing devices, and state of the tamper-evident data structure is determined by consensus among the plurality of computing devices.

18. The medium of claim 1, wherein:
the addresses are, or are associated with, hash values of a distributed hash table.

19. The medium of claim 1, wherein:
the ciphertexts are encrypted with symmetric encryption; and
the decentralized second data repository is a zero-knowledge data repository with respect to plaintext of the ciphertexts.

20. A method, comprising:
receiving, with a server system, via a network, a first query from a first computer system of an entity seeking to acquire information about users,
wherein the first query comprises criteria specifying a first class of attributes of users;
in response to the first query, accessing a first data repository and selecting a first subset of users from a set of users having information in the first data repository, wherein:
the first subset of users are selected based on the first subset of users having attributes that satisfy the criteria; and
the first data repository comprises a plurality of user records each comprising:
a respective pseudonymous user identifier, and
a respective plurality of non-personally identifiable attributes of a respective user;

receiving, with the server system, via the network, from the first computer system, data specifying a second query, wherein:
- the second query requests a second class of attributes of users, and
- the second class of attributes are more personally identifying among the set of users than the first class of attributes;

based on selecting the first subset of users and receiving the data specifying the second query, sending, with the server system, via the network, to native-client-applications executing on user computing devices of at least some of the first subset of users, a request to obtain responses to the second query;

receiving, with the server system, from the native-client-applications of a second subset of users among the first subset of users, approval to obtain responses to the second query;

in response to receiving approval, adjusting, with the server system, respective scores associated with the second subset of users and providing responses to the second query to the first computer system, wherein at part of at least some of the responses to the second query are provided, at least in part, by:
- accessing a tamper-evident data structure that associates pseudonymous user identifiers of respective users with respective addresses of respective ciphertexts and selecting addresses in response to the respective addresses being associated in the tamper-evident data structure with respective pseudonymous user identifiers of at least some users in the second subset of users;
- retrieving ciphertexts identified by the selected addresses from a decentralized second data repository, the decentralized second data repository being different from the tamper-evident data structure and the first date repository;
- decrypting, to form plaintext records, respective ciphertexts with respective native-client-application instances executing on user computing devices of users among the second subset of users, wherein:
  - different native-client-application instances have access to different encryption keys of different ones of the respective ciphertexts, and
  - the server system does not have access to the encryption keys; and
- determining the at least part of the at least some of the responses to the second query with the plaintext records; and storing, with the server system, the adjusted scores in memory, wherein:
- the first computer system is not provided access to personally identifiable information of the plurality of users absent both permission from respective users and adjustments to scores of respective users.

\* \* \* \* \*